Figure 1A:
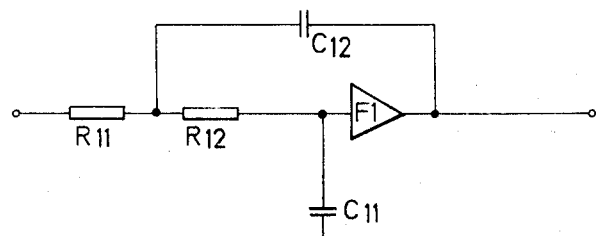

United States Patent

[11] 3,588,531

| | | | |
|---|---|---|---|
| [72] | Inventor | Hakon Einar Bjor | |
| | | Oslo, Norway | |
| [21] | Appl. No. | 779,185 | |
| [22] | Filed | Nov. 26, 1968 | |
| [45] | Patented | June 28, 1971 | |
| [73] | Assignee | Sentralinstitutt for Industriell Forskning | |
| | | Oslo, Norway | |

[54] ANALOG NETWORK BASED ON SAMPLING FOR UNIVERSAL APPLICATIONS FILTER
9 Claims, 7 Drawing Figs.

[52] U.S. Cl. .................................................. 307/229,
307/233, 307/235, 307/295, 328/127, 328/151,
328/167, 333/70
[51] Int. Cl. ...................................................... G06g 7/12,
H03k 5/20
[50] Field of Search............................................ 333/70, 70
(A), 70 (R), 17, 75 (Cursory); 328/151, 127, 142,
140; 307/240, 251, 229, 230, 295

[56] References Cited
UNITED STATES PATENTS
2,891,174  6/1959  Hawkins........................ 307/229

| 2,907,878 | 10/1959 | Young et al. ................... | 328/142 |
| 3,050,673 | 8/1962 | Widmer........................ | 307/229X |
| 3,433,937 | 3/1969 | McCarthy ..................... | 307/229X |
| 3,497,716 | 2/1970 | Schmid et al. ................. | 328/140X |
| 3,390,347 | 6/1968 | Jones et al. .................... | 328/151X |
| 3,411,096 | 11/1968 | Rainger et al.................. | 328/151 |

*Primary Examiner*—Stanley D. Miller, Jr.
*Attorney*—Wenderoth, Lind and Ponack

ABSTRACT: The present filter for filtering analog signals is based on the use of analog networks in which the signals are integrated over time so as to select out a desired frequency range, and is characterized by means for integrating the signals only over separate time intervals, the mutual time spacing of which is shorter than the period of the signals in said desired frequency range. In the case of an electrical filter circuit comprising at least one capacitor there is provided a switching element effectively in series with each capacitor, said switching element being closed during said separate time intervals.

INVENTOR
HÅKON EINAR BJOR

BY Wenderoth, Lind & Ponack
ATTORNEY

ANALOG NETWORK BASED ON SAMPLING FOR UNIVERSAL APPLICATIONS FILTER

This invention relates to the filtering of analog signals by means of analog networks, such as electrical or hydraulic circuits by means of which signals are integrated over time for the purpose of selecting out a desired characteristic frequency or a frequency range. The signals to be integrated can be signals which have been derived from the input signals or they can represent the input signals themselves, and the characteristic frequency or frequencies depend on the resistors and capacitances which may be present in the network. It is a characteristic of the known method of such filtering that the integration takes place over the whole time, i.e. uninterrupted as long as the circuit is switched on and an input signal is applied thereto.

The invention is based on this method and also on the known principle that a continuous curve shape can be restored from sample taken of the continuous curve shape with a repetition frequency higher than the characteristic frequency of the curve.

A substantial disadvantage with networks based on these principles is that the same usually can be employed only for that characteristic frequency or that frequency range which is determined by the component values used in the network, so that the component values must be changed if the network is to be employed for the filtering of other frequencies.

An object of the invention therefore is to provide analog networks which in the first place replace the networks previously employed and in the second place with simple means and without change of component values can be made applicable for filtering other desired frequencies within a large range of characteristic frequencies. This is obtained by basing the analog networks on the principle according to the invention, which is characterized therein that said signals in the analog network are integrated only over separate time intervals the mutual time spacing of which is shorter than the period of the signals in said desired frequency range.

With this specific way of taking samples of the various signals which are handled by an analog network it is possible to restore a curve shape which is in correspondence with the continuous curve shape for the interesting frequencies, at the same time as it is possible to use the network for other characteristic frequencies. As will appear from the explanation below this possibility of varying the desired frequency range results from the fact that those fractions of time which are represented by said separate time intervals can be varied. According to a preferred form of the invention this is done by varying the mutual time spacing between the separate time intervals, whereas the duration thereof is kept constant. The change can be carried out discontinuously for the purpose of employing the network for different frequencies, or it can be carried out continuously for sweeping a whole frequency spectrum.

Even though the invention has significance for various types of analog networks, for instance hydraulic and pneumatic, it is expected that the same will have most practical significance in connection with electrical filter circuits. The invention therefore in the following shall be described more in detail with respect to such analog networks.

Conventionally, electrical filters are usually made with passive components comprising resistors, capacitors and inductors. Such passive filters can be made both as low pass, high pass and band pass filters; however, they are often unpractically heavy and bulky, in particular when they are dimensioned for lower frequencies. In recent time there have also been made active filters by means of resistors, capacitors and amplifiers. In this way the space-consuming inductive components have been avoided. One of the disadvantages of the filters known today is that they usually can be used only for that characteristic frequency for which the individual filter has been made. When the electrical filters are based on the principle according to this invention, each of these filters can be utilized for a large number of characteristic frequencies or for a variable frequency range.

Integrated circuit techniques have acquired a gradually increasing importance during the last years. When it comes to the construction of filters according to this technology, the passive filters are completely unsuited because of the inductive components therein. The same can also be said of the active filters; in any case for low frequency uses, because there is often required resistors in the megohm class and capacitors in the microfarad class, and these component values can hardly be realized in integrated circuits with the technology of today. Besides, the advantages of the integrated circuit technology with low production prices in large unitary series cannot be obtained with such production of filters because the same—as known—must be dimensioned specifically for the individual application.

Another object of the invention therefore is to provide electrical filters which can be produced in integrated circuit technology in large unitary series. These filters, which in a known way comprise active or passive components, of which at least one is a capacitor, are according to the invention characterized therein that a switching element is provided effectively in series with each capacitor, said switching element being closed during said separate time intervals.

This arrangement for example makes it possible to use resistors of the order of magnitude of 1 kohm and capacitors of the order of magnitude of 1000 pF which are quite acceptable values in integrated circuit technology and particularly advantageous in hybrid circuits.

It shall be noted that the term "effectively in series with" in this connection generally is to be taken in the electrical meaning, i.e. with respect to the current through the capacitor. Thus, it is meant that a switching element in addition to be connected directly in series with a capacitor, alternatively can also be connected in series with a parallel connection of a capacitor and an amplifier which does not consume current.

The above switching elements in principle can be mechanical switches or electrical circuits which function as switches. Preferably each switching element comprises a field effect transistor which is controlled by a pulse source.

The characteristic frequency is changed by varying that time portion during which the switching elements are closed. This control of the switching elements can be effected by varying the control pulse width, but it is preferably done by varying the pulse repetition frequency which can easily be kept at a substantially higher value than the characteristic frequency used for the filter, i.e. the separate time intervals are kept constant whereas the mutual time spacing thereof is changed.

The pulse repetition frequency can be varied continuously, which leads to controllable filters for sweeping and adaptive filter applications. On the other side the variation can be carried out discontinuously for the purpose of giving the filter a different characteristic frequency as a result of each change. As an example of the frequency variation range of one and the same circuit 1 c/s to 1 Mc/s can be mentioned, which covers a very large portion of the filter requirements of interest within acoustics and telecommunications.

For a closer explanation of the relationship between frequency and time control of filters according to the invention there shall be taken as example a simple RC circuit the characteristic or critical frequency of which is given by $$W_c = 1/RC.$$

If the capacitor in this circuit according to the invention by means of a switch connected (effectively) in series is switched on in separate time intervals each having a duration $\Delta t$ and is switched off between the same in periods each having a duration $T-\Delta t$, it can be shown that the critical frequency is $$\omega_c = \frac{1}{RC} \cdot \frac{\Delta t}{T}$$

It appears from this that the characteristic frequency is reduced with a factor equal to the ratio between $\Delta t$ and $T$, or in other words in proportion to that time portion or fraction of time during which the switch in front of the capacitor conducts current.

Further in this connection shall be mentioned a possibility of eliminating the effect of drift in frequency determining components in this type of filters according to the invention. If the time interval $\Delta t$ is determined by a RC-circuit with component values $R_1$ and $C_1$, the characteristic frequency is given by the following expression:

$$\omega_c = \frac{R_1 C_1}{RC} \cdot \frac{1}{T}$$

Possible drift in resistance or capacitance values, for instance because of temperature variations, here will be balanced out.

The filter circuit according to the invention is generally applicable in all types of filters and always gives a correct output signal during those time intervals when the switch elements are closed. In active filters with a switch element connected in front of the amplifier and the associated capacitor, the output signals are correct also in the time period between each time the switching elements conduct current. In this case that capacitor which is inserted in front of the amplifier also serves as an interpolating unit which holds the integrated magnitude from one integration time interval to the next. As an alternative thereto the switching element can be inserted between the amplifier and the associated capacitor and with an interpolating unit coupled to the output of the filter circuit. In filters without amplifiers this unit can always be connected to the output of the filter circuit. In general therefore an interpolating unit shall be included in the filter circuit so as to obtain correct or near correct output signal in the time between each time the switching elements conduct current.

The methods of synthesis of the filters according to the invention can be the same as in the case of conventional filters, only with the general additional rule that in the circuit there shall be a switching element, for instance a field effect transistor, in series with each capacitor which is present in the conventional filter configuration. When synthezising a filter according to the invention the skirt selectivity and the relative frequency spacing therefore can be dimensioned in the conventional way, but without taking the characteristic frequency into account because this is adjusted later. Therefore, the same filter circuit can be utilized at a very large number of different frequencies. The result of this is that large numbers of the same integrated circuit can be produced. It is also worth while to mention that this further involves that filters can be manufactured economically with better skirt selectivity specifications than what is strictly necessary for certain practical fields of use.

Figure 1B:
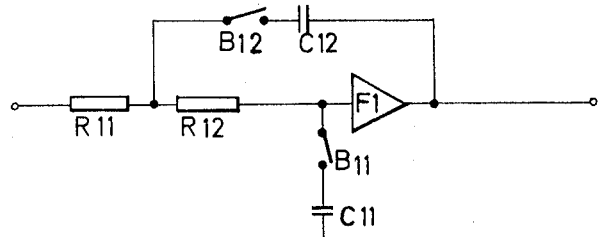
Figure 2A:
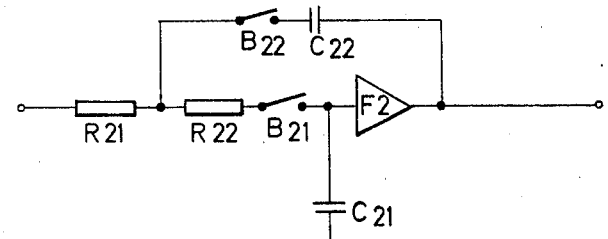
Figure 2B:
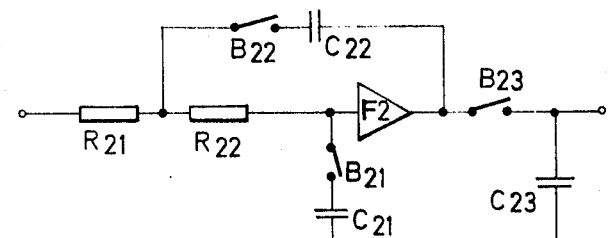
Figure 3:
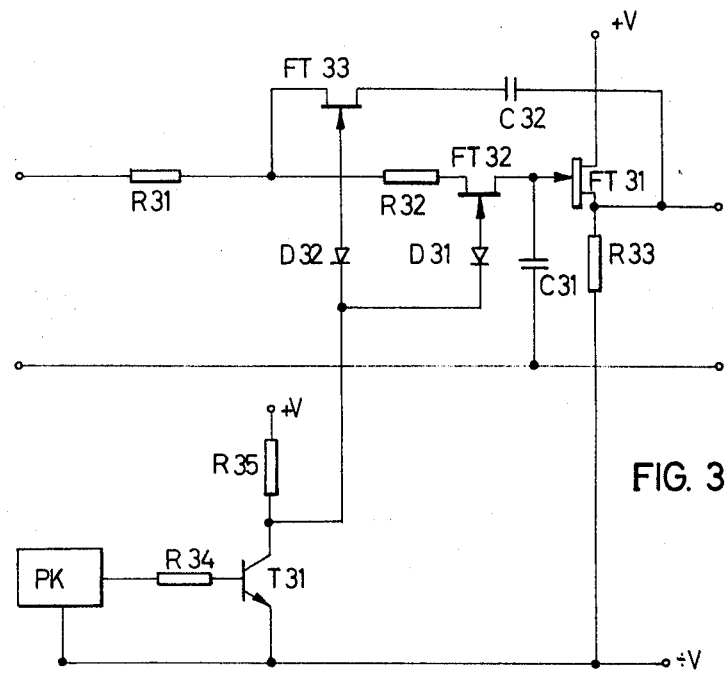
Figure 4:
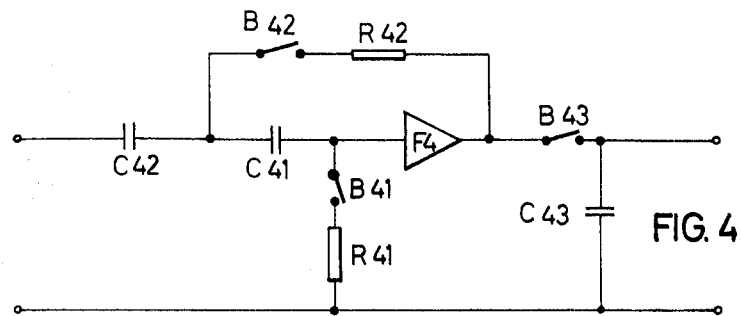
Figure 5:
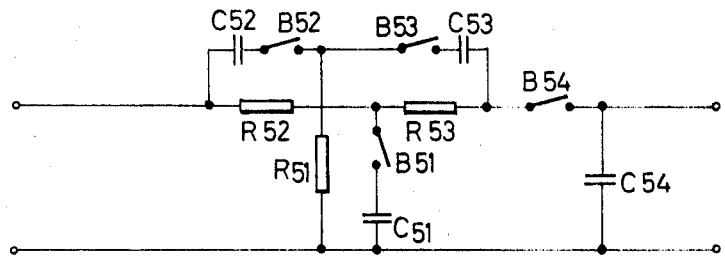

The invention shall now be explained more in detail on the basis of conventional filters and by means of embodiments according to the invention. Reference is made to the drawings in which:

FIG. 1a is a basic circuit diagram of a conventional active low pass filter of the second order, FIG. 1b shows a basic circuit diagram of a corresponding filter according to the invention, FIG. 2a shows another embodiment according to the invention based on the filter of FIG. 1b, FIG. 2b shows a third embodiment with a separate interpolation capacitor, FIG. 3 shows a preferred circuit diagram according to the basic circuit of FIG. 2a, FIG. 4 is a basic circuit diagram of an active high pass filter according to the invention, and FIG. 5 shows the principle of a passive filter configuration according to the invention.

In FIG. 1a there is shown how resistors $R_{11}$ and $R_{12}$, capacitors $C_{11}$ and $C_{12}$ and an amplifier $F_1$ can be connected in a low pass filter of the second order. As known, a set of component values in such a circuit results in a certain characteristic frequency. For a different characteristic frequency the resistors and the capacitors must be exchanged with components of different values.

In FIG. 1b the corresponding circuit according to the invention is shown, with a switching element $B_{11}$ connected in series with the capacitor $C_{11}$ and a switching element $B_{12}$ connected in series with the capacitor $C_{12}$. The switching elements $B_{11}$ and $B_{12}$ can be controlled or activated in common in any desired way. It is seen that the integration is effected by means of the capacitors $C_{11}$ and $C_{12}$ only during that time when the switching elements $B_{11}$ and $B_{12}$ for each time permit signals to pass, and that the characteristic frequency will be dependent upon in how large fraction of the time the integration takes place each time the switching elements are closed. Therefore, simply by having the switching elements $B_{11}$ and $B_{12}$ each time close the circuit in a different fraction of time, the circuit can be used for another characteristic frequency without having to change the resistances and capacitor values.

As will be understood the characteristic frequency of one and the same filter in this way can be changed simply by changing the time during which the switching elements are closed, whereas the characteristic skirt selectivities remain unchanged.

Typical capacitors in the circuit according to the invention can be of the order of magnitude of 1000 pF and the resistors can be of the order of magnitude of 1 kohm. A possible frequency variation range can be the range between 1 c/s and 1 Mc/s.

The filter circuits according to the invention are also suitable as controllable filters for sweeping and adaptive filter applications and as frequency governing networks in controllable oscillators, because there is a linear and clear correspondence between the time intervals $\Delta t$ and time spacing T of the control signal on the one hand and the characteristic frequency on the other hand, as explained above.

So as to get correct output signal also in the period between each time the switching elements close the circuit, two embodiments according to the invention shall now be explained with reference to FIGS. 2a and 2b. In the FIGS. the resistors $R_{21}$ and $R_{22}$ correspond to the above resistors $R_{11}$ and $R_{12}$. Further, the capacitors $C_{21}$ and $C_{22}$ correspond to the above capacitors $C_{11}$ and $C_{12}$, whereas the amplifier circuit $F_2$ corresponds to the amplifier $F_1$ of the preceding FIGS.

In FIG. 2a the switching element $B_{21}$ is connected in series with the capacitor $C_{21}$ in such a way that it is located in front of both the capacitor $C_{21}$ and the amplifier $F_2$ which does not consume current. The capacitor $C_{21}$ then simultaneously acts as an interpolation unit in the filter circuit by maintaining the integrated value at the output terminals in the time period between each time the switching elements close the circuit.

In FIG. 2b the switching element $B_{21}$ is connected in series with the capacitor $C_{21}$, but in such a way that it is located between the capacitor $C_{21}$ and the amplifier $F_2$. As interpolation unit there is at the output of the circuit connected a capacitor $C_{23}$ and a switching element $B_{23}$ which is controlled in common with the switching elements $B_{21}$ and $B_{22}$. Also in this case the last integrated value will be held at the output until the next integration time interval.

In FIG. 3 the resistors $R_{31}$ and $R_{32}$ and the capacitors $C_{31}$ and $C_{32}$, respectively correspond to resistors and capacitors in a conventional low-pass filter of the second order, whereas the field effect transistor $FT_{31}$ and the resistor $R_{33}$ correspond to the amplifier. As switching elements according to the invention are acting the field effect transistors $FT_{32}$ and $FT_{33}$, of which the former $FT_{32}$ is located in front of both the amplifier $FT_{31}$, $R_{33}$ and the capacitor $C_{31}$ according to FIG. 2a. In series with the gate electrode of each field effect transistor $FT_{32}$ and $FT_{33}$ there is connected a diode $D_{31}$ and $D_{32}$, respectively, so as to prevent the flow of current in the gate electrode, which makes the switches $FT_{32}$, $FT_{33}$ more ideal. The switches are controlled by pulses from a pulse source PK through a transistor $T_{31}$ with base resistor $R_{34}$ and load resistor $R_{35}$. As seen, the field effect transistor $FT_{32}$ is arranged in such a way that the capacitor $C_{31}$ all the time holds the voltage on the gate electrode of the field effect transistor $FT_{31}$, and thus smooths the signals so that they will be correct or substantially correct also in the time between each control pulse applied to the field effect transistors $FT_{32}$ and $FT_{33}$.

In FIG. 4 the resistors $R_{41}$ and $R_{42}$, the capacitors $C_{41}$ and $C_{42}$ and the amplifier $F_4$ correspond to the components in a conventional active high pass filter of the second order. According to the invention the switching elements $B_{41}$ and $B_{42}$ are inserted so as to effect integration in fractions of the time. Further, a switching element $B_{43}$ and a capacitor $C_{43}$ can be connected to the output of the circuit so as to provide for holding of the last integrated value at the output until the subsequent time for closing the switching elements $B_{41}$ and $B_{42}$. The switching elements are preferably field effect transistors which are controlled by means of pulses from for instance a pulse generator.

In FIG. 5 the resistors $R_{51}$, $R_{52}$ and $R_{53}$ and the capacitors $C_{51}$, $C_{52}$, and $C_{53}$ correspond to the components in a conventional passive filter, a so-called Twin T filter. In accordance with the principle of the invention there are in series with the capacitors connected switching elements $B_{51}$, $B_{52}$, and $B_{53}$ which can for instance be field effect transistors controlled by means of pulses. Further, a switching elements $B_{54}$ and a capacitor $C_{54}$ are connected into the circuit for holding the integrated value in the time between each control pulse.

It will be understood that band pass filters can be made according to the same principle by for instance connecting in series in a known way low-pass filters and high pass filters which have been constructed according to the invention.

Above in the examples of electrical circuits according to the invention the employment of capacitors has been presumed for attaining the desired effect. It is obvious that also inductivities in principle can be used as a basis for the invention when the duality between capacity and inductivity is taken into account. Thus, in filter circuits with inductivities the switching elements for on and off switching would have to be connected each in parallel with its inductivity and the switches would have to be opened in the integration time intervals. In closed switch position in the time between these intervals, the current in the inductivity in the ideal—and presently in practice unattainable—case, would be maintained constant.

It is finally evident that in nonelectrical systems, for instance hydraulic and pneumatic systems, fully corresponding effects are possible because of the complete analogy between such systems and the electrical systems which have been described above.

I claim:

1. A filter for filtering analog signals comprising input means receiving input analog signals to be filtered, analog network means coupled to said input means having integrating means comprising a plurality of capacitances and a plurality of resistances for filtering said signals, sampling switch means, means for operating said switch means, each sampling switch means being coupled effectively in series with each of said capacitances, and said operating means being coupled to said switch means for synchronous operation thereof at a repetition frequency of common sampling intervals higher than the frequency of said input signals to provide integration only during separate time intervals corresponding to said sampling intervals, and output means coupled to said network means for supplying filtered output signals containing frequencies selected by said integration means and said sampling repetition frequency.

2. A filter as claimed in claim 1, wherein said operating means operates said switch means with a variable ratio between the duration of said separate time intervals and the mutual time spacing thereof.

3. A filter for filtering analog signals comprising input means receiving input analog signals to be filtered, analog network means coupled to said input means having integrating means comprising a plurality of capacitances and a plurality of resistances for filtering said signals, sampling switch means, means for operating said switching means, each sampling switch means being coupled effectively in series with each of said capacitances, and said operating means being coupled to said switch means for synchronous operation thereof at a repetition frequency of common sampling intervals higher than the frequency of said input signals to provide integration only during separate time intervals corresponding to said sampling intervals, signal storing means, and output means coupled to said network means for supplying filtered output signals containing frequencies selected by said integration means and said sampling repetition frequency, said storing means comprising a capacitance connected across said output means, and a switching element connected between said network means and one of said output means operated in synchronism with said sampling switch means.

4. A filter as claimed in claim 3, wherein said operating means operates said switch means and switching element with a variable ratio between the duration of said separate time intervals and the mutual time spacing thereof.

5. A filter as claimed in claim 4, wherein said operating means operates with a variable ratio for varying said mutual time spacing and keeping said separate time intervals constant.

6. A filter for filtering analog signals comprising input means receiving input analog signals to be filtered, analog network means coupled to said input means having integrating means comprising a plurality of capacitors and a plurality of resistances for filtering said signals, electronic sampling switch means comprising at least one field effect transistor and a pulse source with variable pulse repetition frequency, each field effect transistor being coupled effectively in series with each of said capacitors, and said pulse source being coupled to said transistors for synchronous operation thereof at a sampling repetition frequency of common sampling intervals higher than the frequency of said input signals to provide integration only during separate time intervals corresponding to said sampling intervals, a signal storing capacitor and a switching element, output means coupled to said network means for supplying filtered output signals containing frequencies selected by said integration means and said sampling repetition frequency, said storing capacitor being connected across said output means and said switching element being connected between said network means and one of said output means and operated in synchronism with said field effect transistors, and said pulse source being operable for said transistors and switching element to vary the ratio between the duration of said separate time intervals and the mutual time spacing thereof.

7. A filter as claimed in claim 6, wherein said signal storing capacitor is an integrating capacitor forming part of the filter network.

8. A filter as claimed in claim 6, wherein said pulse source operates said switch means and switching element with a variable ratio between the duration of said separate time intervals and the mutual time spacing thereof.

9. A filter as claimed in claim 8, wherein said pulse source operates for varying said time spacing continuously.